April 24, 1956     D. A. JOHNSON     2,743,075

MOUNTING BRACKET FOR VEHICLE ASH RECEPTACLE

Filed Jan. 5, 1951

INVENTOR.
DELNO A. JOHNSON,
BY
McMorrow, Berman + Davidson
ATTORNEYS.

United States Patent Office 2,743,075
Patented Apr. 24, 1956

2,743,075

MOUNTING BRACKET FOR VEHICLE ASH RECEPTACLE

Delno A. Johnson, Monterey Park, Calif.

Application January 5, 1951, Serial No. 204,663

2 Claims. (Cl. 248—224)

This invention appertains to improvements in ash receptacles and especially relates to improvements in ash receptacles, designed and constructed for attachment to the interior of a vehicle, adjacent to one of the windows thereof.

A primary object of the instant invention is to provide an ash receptacle, which is constructed with mounting means, engageable on the mullion bar of a window frame, so that the ash receptacle is positioned adjacent to the swingable ventilating pane.

Another object of this invention is to provide means for mounting a detachable ash receptacle on the mullion bar of the window frame on the driver's side of a vehicle, so that the ash receptacle is positioned adjacent to the driver of the vehicle, so as to receive ash deposits and cigarettes, without requiring the driver's attention to be diverted from the road.

A further object of this invention is to provide means for attaching a mounting member to the mullion bar of a window frame of a vehicle and to provide means for slidably mounting an ash receptacle on the mounting means, so that the ash receptacle projects inwardly from the mullion bar and is disposed in a convenient position for occupants of the vehicle.

These and ancillary objects and structural features of merit are attained by this invention, the preferred embodiment of which is set forth in the following description and illustrated in the accompanying drawing, wherein.

Figure 1:
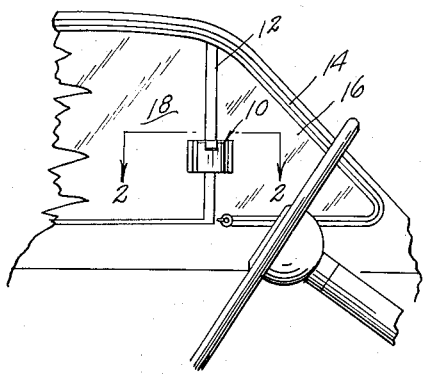
Figure 1 is a fragmentary elevational view of the window frame assembly of a vehicle, at the driver's side of the vehicle, with an ash receptacle, constructed in accordance with the principles of this invention, mounted on the mullion or fixed vertical bar of the frame.
Figure 2:
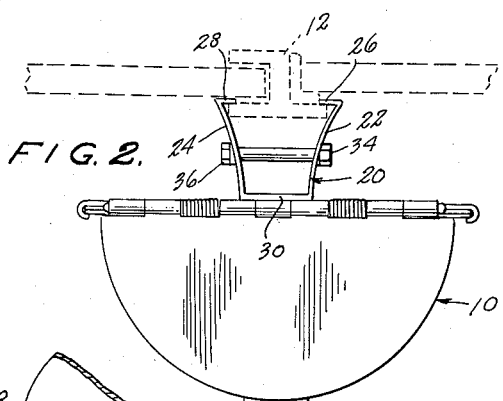
Figure 2 is a top plan view of the ash receptacle, the view being taken on line 2—2 of Figure 1.
Figure 3:
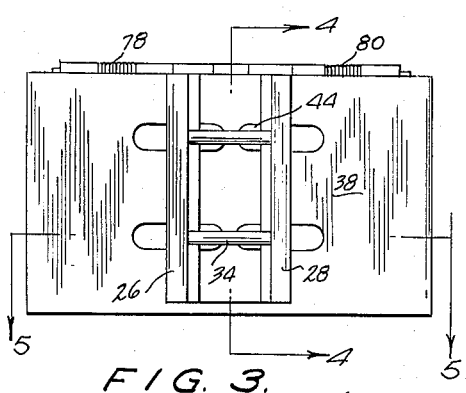
Figure 3 is a rear elevational view thereof.

In the illustrated embodiment, the ash receptacle 10 is especially designed and constructed for attachment to the mullion bar 12 of the window frame assembly 14, the window frame assembly being of a conventional nature. The ash receptacle is, thus, disposed adjacent to the swingable ventilating pane 16 and the vertically movable side window 18.

The ash receptacle includes a U-shaped mounting member 20, which is formed with a pair of outwardly bowed legs 22 and 24. Lateral inwardly directed flanges 26 and 28 are formed on the free ends of the legs and parallel the bight portion 30 of the mounting member, the flanges being engageable on one leg of the channel part of the mullion bar 12 and on the aligned flange of the mullion bar. Bolts 34 are transversely disposed through the legs 22 and 24 and barrel nuts 36 are threaded on the threaded ends of the bolts for locking the flanges 26 and 28 on the inner portions of the mullion bar. The mounting member is positioned so that the bight portion 30 parallels the mullion bar and is disposed vertically, with respect to the door of the vehicle.

Figure 6:
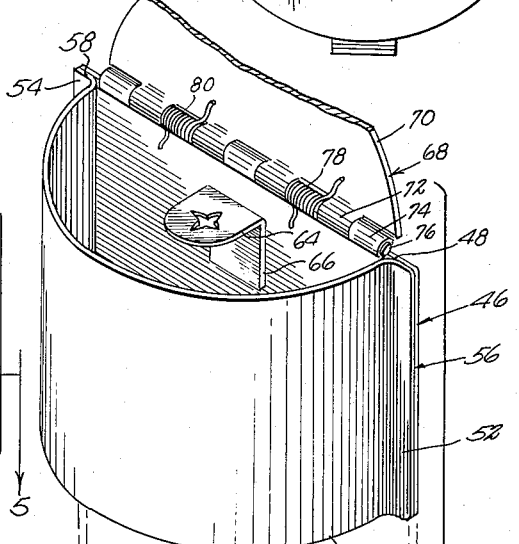
Figure 6 is an exploded perspective view of the ash receptacle, illustrating the mounting and supporting means therefor.
Figure 4:
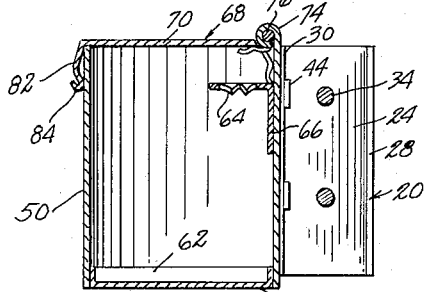
Figure 4 is a vertical sectional view taken on line 4—4 of Figure 3.
Figure 5:
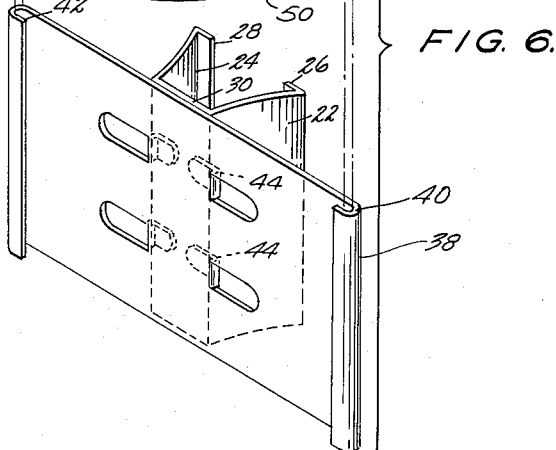
Figure 5 is a longitudinal sectional view taken on line 5—5 of Figure 3.

A supporting member 38 is provided and is substantially rectangular in shape, the opposing side edges of the member being inturned relative to each other to form opposing side guideways 40 and 42. Tabs 44 are struck outwardly and rearwardly from the center portion of the supporting member or plate and are gripped on the bight portion 30 of the mounting member, the lugs being inserted through suitable openings formed in the legs 22 and 24. The supporting member projects laterally from the bight portion and has its upper and lower edges disposed flush with the upper and lower edges of the bight portion, as seen in Figure 6.

An ash receptacle 46 is provided and includes a flat substantially rectangular back wall 48 and an arcuate front wall 50. The front wall 50 is formed with lateral end flanges 52 and 54 which are affixed to the opposing end edges of the back wall and cooperate therewith to form rails 56 and 58, which are adapted to be slidably received in the guideways 40 and 42, thus mounting the ash receptacle on the supporting member or plate.

A semi-circular bottom wall 60 is formed with an upstanding peripheral flange 62, which is disposed within the back and front wall and suitably affixed thereto. A snuffer plate 64 is provided with a lateral mounting flange 66, which is suitably superimposed on the back wall 48 of the ash receptacle, with the snuffer plate being disposed below the upper edges of the back and front walls.

A cover member 68 is provided and includes a semi-circular plate 70, having hinge ears 72 formed integral on the straight edge thereof, the hinge ears being alignable with upstanding hinge ears 74 formed on the upper edge of the back wall 48. A pintle pin 76 is disposed through the aligned ears and springs 78 and 80 are circumposed on the pintle pin, with their opposing ends bearing against the back wall 48 and the plate 70, so as to bias or urge the plate into a raised position.

A locking flange 82 is formed at the center of the arcuate edge of the plate 70 and is provided with a reinforced free end 84, engageable on the front wall 50 of the ash receptacle, for locking the cover in a closed position on the upper edge of the front wall, against the urgement of the springs.

In use, the flanges 26 and 28 of the mounting member are gripped on the inner portions of the mullion bar 12 and are securely clamped therein by the bolt assemblies 34, so that the bight portion 30 is disposed inwardly from the mullion bar and supports the supporting plate 38. The ash receptacle is slidably disposed on the supporting plate, with the back wall 48 engaging the supporting plate and the opposing rails 56 and 58 received in the guideways 40 and 42. The rails are frictionally held in the guide rails but are easily detached therefrom for emptying the ash receptacle.

The cover member is locked in a closed position by the locking plate 82 and, upon release thereof, the springs are operative to urge the cover plate to a raised position. It will be noted that the snuffer plate is disposed below the upper edges of the front and back walls of the ash receptacle, so that, when a cigarette is snuffed out, there is little possibility of the spark or ashes falling onto the upholstery. The receptacle is positioned in a convenient placement, with respect to the driver of a vehicle, so that the driver may deposit ashes or a cigarette in the receptacle, without removing his eyes from the road and also, the ash receptacle, since it is positioned adjacent to the ventilating panel 16, may be easily vented to remove stale smoke or burning cigarette odors.

Having thus described this invention, what is claimed is:

1. In an article mounting bracket, a flat plate, said plate having a first side and a second side, article-engaging means on said first side of the plate, a bracket member at the second side of the plate, said bracket member comprising a flat web bearing against said second side of the plate and support engaging arms on opposite ends of the web projecting away from the second side of the plate, and means securing the web to the plate, said plate having upper and lower edges and opposite ends, and a central portion, said web being engaged only with said central portion and having upper and lower edges, said web being spaced from the ends of the plate, said securing means comprising tabs cut out of the plate at opposite sides of the web, said arms having slots through which the tabs extend with the tabs bearing against the side of the web remote from the plate.

2. In a mounting bracket, a flat article mounting plate, a bracket member comprising a web engaged with one side of said plate having opposed side edges, support engaging arms projecting from said opposite side edges in a direction away from said one side of the mounting plate, and tab means on said mounting plate at the opposite side edges of said web, said tab means having free end portions bent across and engaged with the side of said web remote from the mounting plate and securing the bracket member on said mounting plate, said tab means comprising a pair of individual tabs on the mounting plate at each of the opposite side edges of the bracket member web, engaging through slots provided in the related arms.

References Cited in the file of this patent

UNITED STATES PATENTS

| | | |
|---|---|---|
| 644,080 | Huebel | Feb. 27, 1900 |
| 975,426 | Hill | Nov. 15, 1910 |
| 1,085,421 | Hiller | Jan. 27, 1914 |
| 1,241,922 | Chappell | Oct. 2, 1917 |
| 1,622,167 | Smith | Mar. 22, 1927 |
| 1,667,653 | Cizek | Apr. 24, 1928 |
| 1,681,710 | Ostrander | Aug. 21, 1928 |
| 1,720,309 | Wakefield | July 9, 1929 |
| 1,863,988 | Kupfer | June 21, 1932 |
| 1,866,665 | Olin | July 12, 1932 |
| 1,994,933 | Visser | Mar. 19, 1935 |
| 2,303,980 | Bonbright | Dec. 1, 1942 |
| 2,495,860 | Miller | Jan. 31, 1950 |

FOREIGN PATENTS

| | | |
|---|---|---|
| 529,204 | Great Britain | Nov. 15, 1940 |